United States Patent
Yoshinaga et al.

(10) Patent No.: US 11,709,312 B2
(45) Date of Patent: *Jul. 25, 2023

(54) PLANAR LIGHT SOURCE INCLUDING LIGHT ADJUSTMENT MEMBERS

(71) Applicant: NICHIA CORPORATION, Anan (JP)

(72) Inventors: Satoshi Yoshinaga, Tokushima (JP);
Takuya Nakabayashi, Tokushima (JP);
Yuki Shibutani, Komatsushima (JP);
Yoichi Bando, Anan (JP); Yasushi Okamoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,066

(22) Filed: Jul. 13, 2022

(65) Prior Publication Data
US 2023/0013159 A1 Jan. 19, 2023

(30) Foreign Application Priority Data
Jul. 19, 2021 (JP) ................................ 2021-118621

(51) Int. Cl.
*F21V 8/00* (2006.01)

(52) U.S. Cl.
CPC ......... *G02B 6/0088* (2013.01); *G02B 6/0021* (2013.01); *G02B 6/0035* (2013.01); *G02B 6/0055* (2013.01); *G02B 6/0058* (2013.01); *G02B 6/009* (2013.01); *G02B 6/0066* (2013.01); *G02B 6/0091* (2013.01)

(58) Field of Classification Search
CPC ................ G02B 6/0021; G02B 6/0024; G02F 1/133603
See application file for complete search history.

(56) References Cited

U.S. PATENT DOCUMENTS

2008/0218072 A1    9/2008  Haruna et al.
2011/0194034 A1*   8/2011  Shimizu ............... G02B 6/0036
                                                  348/739

(Continued)

FOREIGN PATENT DOCUMENTS

JP   2008-218511 A    9/2008
JP   2011-114222 A    6/2011

(Continued)

*Primary Examiner* — Keith G. Delahoussaye
(74) *Attorney, Agent, or Firm* — Foley & Lardner LLP

(57) ABSTRACT

A planar light source includes: a light guide member, a light source including a light-emitting element and a first light adjustment member and being disposed in a first hole of the light guide member, a first light-transmissive member disposed in the first hole between a lateral surface of the light source and the light guide member and on the light source, and a second light adjustment member disposed on the first light-transmissive member. A transmittance of the first light-transmissive member is higher than a transmittance of the first light adjustment member and a transmittance of the second light adjustment member with respect to light emitted from the light source. The first light-transmissive member includes a first light-transmissive portion located between the first light adjustment member and the second light adjustment member, and a second light-transmissive portion located between the lateral surface of the light source and the light guide member.

11 Claims, 16 Drawing Sheets

(56) References Cited

U.S. PATENT DOCUMENTS

| | | |
|---|---|---|
| 2013/0242600 A1 | 9/2013 | Franklin et al. |
| 2016/0020369 A1 | 1/2016 | Ukawa |
| 2020/0049877 A1 | 2/2020 | Watanabe et al. |
| 2020/0209458 A1* | 7/2020 | Yuu .................. H01L 33/62 |
| 2020/0379165 A1 | 12/2020 | Hayashi |
| 2021/0036050 A1 | 2/2021 | Hiraide |
| 2021/0088844 A1 | 3/2021 | Kasai |
| 2021/0096291 A1 | 4/2021 | Emura |
| 2021/0239296 A1 | 8/2021 | Nakabayashi et al. |
| 2021/0239298 A1 | 8/2021 | Hashimoto |
| 2021/0242181 A1 | 8/2021 | Hashimoto |
| 2021/0242375 A1 | 8/2021 | Hashimoto |
| 2021/0247051 A1 | 8/2021 | Nakabayashi et al. |
| 2021/0247052 A1 | 8/2021 | Nakabayashi et al. |
| 2021/0247053 A1 | 8/2021 | Nakabayashi et al. |

FOREIGN PATENT DOCUMENTS

| | | |
|---|---|---|
| JP | 2015-509655 A | 3/2015 |
| JP | 2016-029720 A | 3/2016 |
| JP | 2018-101521 A | 6/2018 |
| JP | 2020-198421 A | 12/2020 |
| JP | 2021-027128 A | 2/2021 |
| JP | 2021-027129 A | 2/2021 |
| JP | 2021-057574 A | 4/2021 |
| JP | 2021-057586 A | 4/2021 |
| JP | 2021-082849 A | 5/2021 |
| JP | 2021-125302 A | 8/2021 |
| JP | 2021-125453 A | 8/2021 |
| JP | 2021-125455 A | 8/2021 |
| JP | 2021-125456 A | 8/2021 |
| JP | 2021-125457 A | 8/2021 |
| JP | 2021-125481 A | 8/2021 |
| JP | 2021-125484 A | 8/2021 |
| JP | 6924958 B1 | 8/2021 |
| JP | 2021-166133 A | 10/2021 |
| JP | 2021-170610 A | 10/2021 |
| WO | WO-2021/153561 A1 | 8/2021 |

* cited by examiner

PLANAR LIGHT SOURCE INCLUDING LIGHT ADJUSTMENT MEMBERS

CROSS-REFERENCE TO RELATED APPLICATION

This application claims priority to Japanese Patent Application No. 2021-118621, filed on Jul. 19, 2021, the disclosure of which is hereby incorporated by reference in its entirety.

BACKGROUND

The present disclosure relates to a planar light source.

A light-emitting module acquired by combining a light-emitting element such as a light-emitting diode with a light guide plate is widely used in a planar light source such as a backlight for a liquid crystal display, for example. See, for example, Japanese Patent Publication No. 2018-101521.

SUMMARY

One object of an embodiment of the present disclosure is to provide a planar light source that can reduce luminance unevenness.

According to an embodiment of the present disclosure, a planar light source includes: a light guide member having a first surface, a second surface on an opposite side to the first surface, and a first hole penetrating from the first surface to the second surface; a light source including a light-emitting element and a first light adjustment member having, on an upper surface, light reflectivity and being light-transmissive to light emitted from the light-emitting element, and being disposed in the first hole of the light guide member; a first light-transmissive member disposed between a lateral surface of the light source in the first hole and the light guide member and disposed on the light source; and a second light adjustment member being disposed on the first light-transmissive member, and having light reflectivity and being light-transmissive to light emitted from the light source. A transmittance of the first light-transmissive member is higher than a transmittance of the first light adjustment member and a transmittance of the second light adjustment member with respect to light emitted from the light source. The first light-transmissive member includes a first light-transmissive portion located between the first light adjustment member and the second light adjustment member, and a second light-transmissive portion located between the lateral surface of the light source and the light guide member. The second light adjustment member has a portion having a maximum thickness on a portion located on the second light-transmissive portion in a cross-sectional view.

A planar light source according to an embodiment of the present disclosure can reduce luminance unevenness.

DETAILED DESCRIPTION

Figure 1:
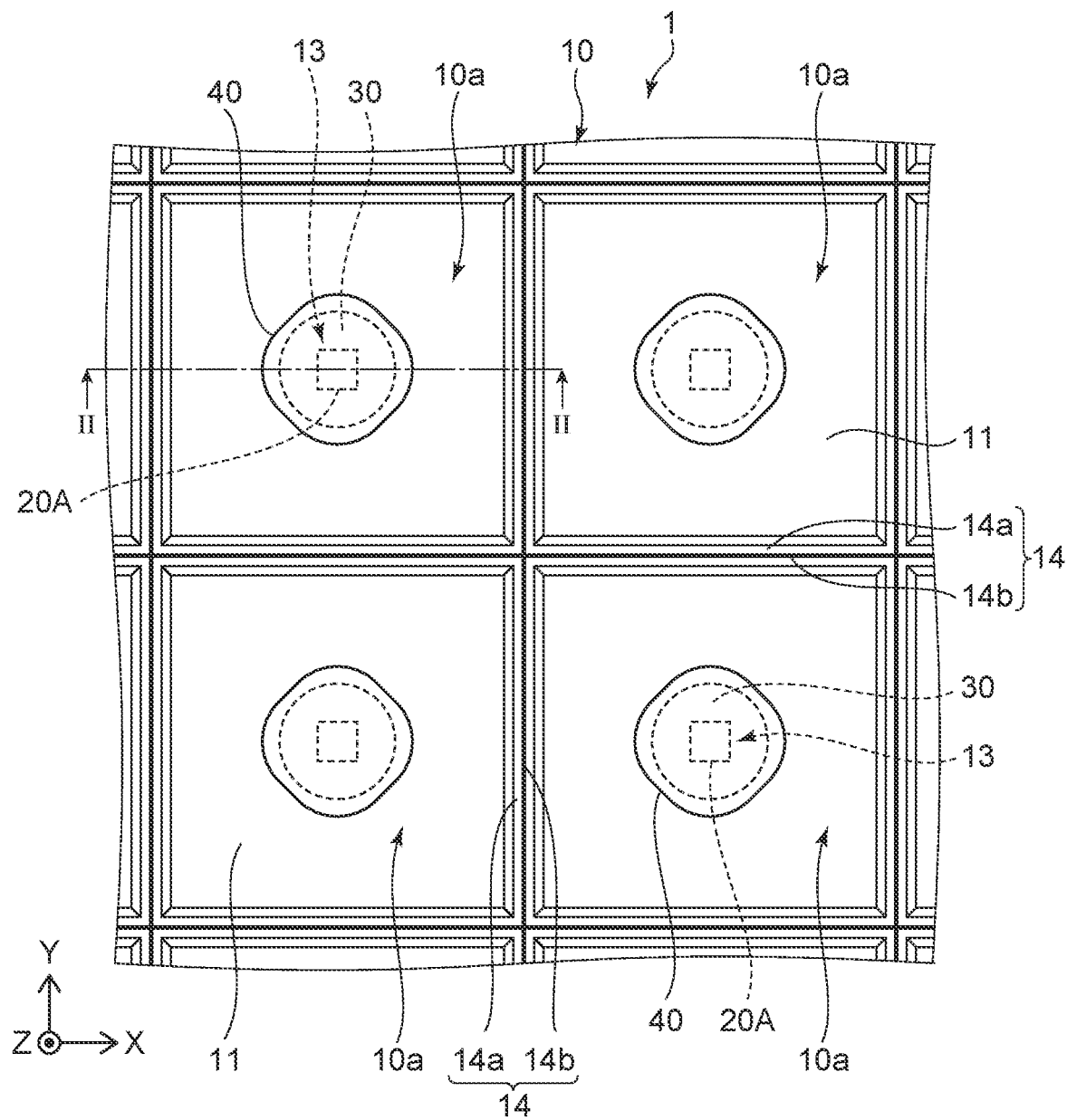
FIG. 1 is a schematic top view illustrating a planar light source according to a first embodiment.

Embodiments will be described below with reference to the drawings. Note that the drawings are schematic diagrams illustrating embodiments, and thus scales, intervals, positional relationships, or the like of members are exaggerated, or illustration of some of the members may be omitted. As a cross-sectional view, an end surface illustrating only a cut surface may be illustrated.

In the following description, components having substantially the same function may be denoted by the same reference characters, and a repeated description thereof may be omitted. Further, terms indicating a specific direction or position ("upper," "lower," and other terms related to these terms) may be used. However, these terms are used merely to make it easy to understand relative directions or positions in the referenced drawing. As long as the relative direction or position is the same as that described in the referenced drawing using the term such as "upper" or "lower," in drawings other than the drawings of the present disclosure, actual products, and the like, components need not necessarily be arranged in the same manner as in the referenced drawing. In the present specification, "parallel" includes not only a case in which two straight lines, sides, surfaces, and the like extend without intersecting each other, but also includes a case in which two straight lines, sides, surfaces, and the like intersect each other in a range within 10°. In the present specification, the term "on" includes a case in which an object is in contact and also a case in which an object is not in contact but located above.

First Embodiment

A planar light source 1 according to a first embodiment will be described with reference to FIGS. 1 to 4D.

The planar light source 1 includes a light guide member 10, a light source 20A, a support member 50, a first light-transmissive member 30, and a second light adjustment member 40.

Hereinafter, each element constituting the planar light source 1 will be described in detail.

Light Guide Member

Figure 2:
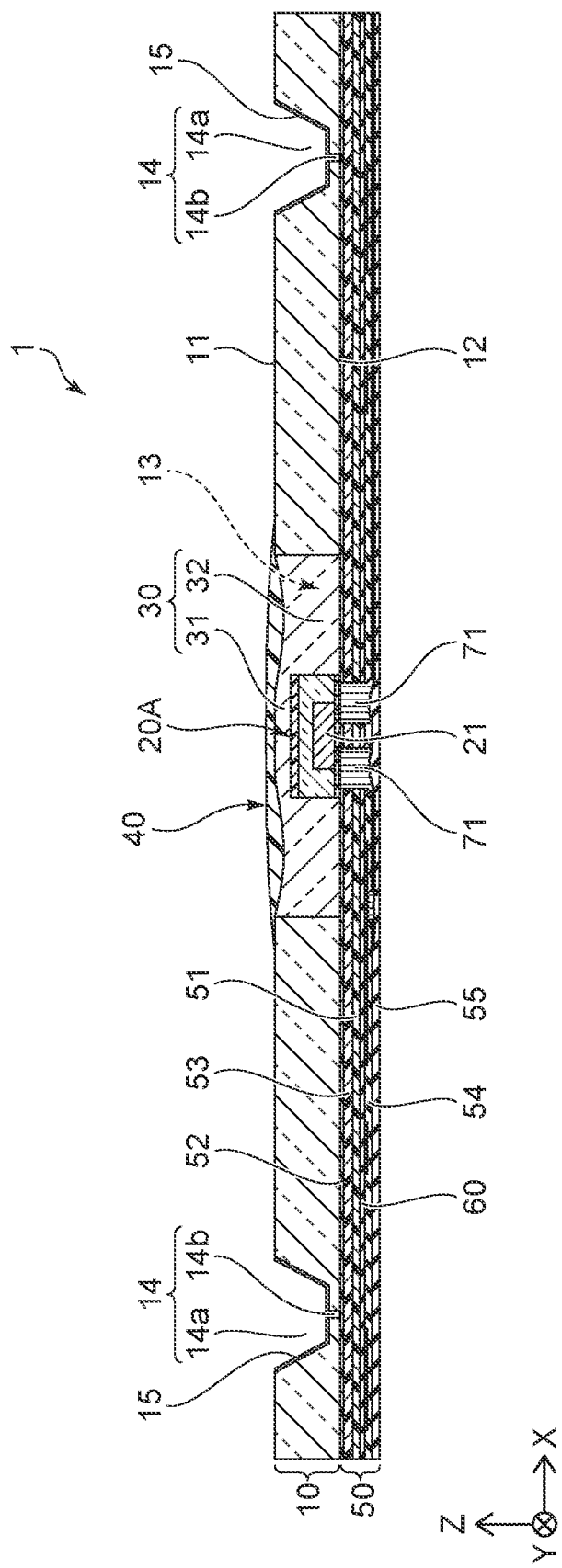
FIG. 2 is a schematic cross-sectional view taken along a line II-II in FIG. 1.

As illustrated in FIG. 2, the light guide member 10 has a first surface 11, and a second surface 12 on a side opposite the first surface 11. In the present specification, two directions that are parallel to the first surface 11 of the light guide member 10 and are orthogonal to each other are referred to as a first direction X and a second direction Y. Further, a direction extending from the second surface 12 to the first surface 11 and orthogonal to the first direction X and the second direction Y is referred to as a third direction Z.

As illustrated in FIG. 1, the light guide member 10 includes a plurality of light guide portions 10a. The light guide portions 10a are separated from each other in the first direction X and the second direction Y by a groove 14 described below. One light guide portion 10a can be, for example, a drive unit of local dimming. Note that, in some embodiments, the light guide member 10 is not separated into the plurality of light guide portions 10a.

The light guide member 10 is light-transmissive to light emitted from the light source 20A. A transmittance of the light guide member 10 with respect to a peak wavelength of the light source 20A is preferably equal to or greater than 50% and more preferably equal to or greater than 70%, for example.

As a material of the light guide member 10, a thermoplastic resin such as acrylic, polycarbonate, cyclic polyolefin, polyethylene terephthalate, or polyester, a thermosetting resin such as epoxy or silicone, or glass can be used, for example.

A thickness of the light guide member 10 is preferably in a range from 150 μm to 800 μm, for example. In the present specification, a thickness of each member represents a maximum value of a distance between an upper surface and a lower surface of each member in the third direction Z. The light guide member 10 may be formed of a single layer or may be formed of a layered body of a plurality of layers in the third direction Z. When the light guide member 10 is formed of a layered body, a light-transmissive adhesive layer may be disposed between layers. The layers of the layered body may use different kinds of chief materials. As a material of the adhesive layer, a thermoplastic resin such as acrylic, polycarbonate, cyclic polyolefin, polyethylene terephthalate, or polyester, or a thermosetting resin such as epoxy or silicone can be used, for example.

The light guide member 10 has a first hole 13 penetrating from the first surface 11 to the second surface 12. The light guide member 10 has a plurality of first holes 13. For example, one first hole 13 is disposed in each of the plurality of light guide portions 10a. As illustrated in FIG. 1, the first hole 13 can be, for example, a circle in a top view. Further, the shape of the first hole 13 can be, for example, an ellipse, or a polygon such as a triangle, a quadrilateral, a hexagon, or an octagon in the top view.

The groove 14 that separates the light guide portions 10a from each other is formed in the light guide member 10. As illustrated in FIG. 1, the groove 14 extends in the first direction X and the second direction Y in the top view. As illustrated in FIG. 2, the groove 14 includes a first groove portion 14a that is open to the first surface 11 side, and a second groove portion 14b that is open to the second surface 12 side. The first groove portion 14a and the second groove portion 14b are connected to each other in the third direction Z. A width of the first groove portion 14a is greater than a width of the second groove portion 14b. The width of the first groove portion 14a and the width of the second groove portion 14b are a width in a direction orthogonal to a direction in which the groove 14 is elongated.

As illustrated in FIG. 2, a partition member 15 can be disposed in the first groove portion 14a. The partition member 15 has light reflectivity to the light emitted from the light source 20A. The partition member 15 is, for example, a resin member containing light scattering particles. As the light scattering particles of the partition member 15, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the partition member 15, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. The partition member 15 may be a metal member made of, for example, aluminum or silver. For example, the partition member 15 may be disposed in a film shape along an inside lateral surface of the first groove portion 14a. The partition member 15 may fill the first groove portion 14a.

The partition member 15 suppresses light propagation between the adjacent light guide portions 10a. For example, light propagation from the light guide portion 10a in a light emission state to the light guide portion 10a in a non-light emission state is limited by the partition member 15. In this way, local dimming with each of the light guide portions 10a as a drive unit can be achieved.

In FIG. 2, the groove 14 penetrates from the first surface 11 to the second surface 12 of the light guide member 10. The groove 14 may be a bottomed groove having an opening on the first surface 11 side, and having a bottom that does not reach the second surface 12. The groove 14 may be a bottomed groove having an opening on the second surface 12 side, and having a bottom that does not reach the first surface 11. The groove 14 may be a hollow groove provided inside the light guide member 10.

The light guide member 10 is disposed on the support member 50 with the second surface 12 facing an upper surface of the support member 50.

Light Source

The light source 20A is disposed in the first hole 13 of the light guide member 10. The light sources 20A are disposed in corresponding first holes 13. The light source 20A is disposed on the support member 50 in the first hole 13.

The light source 20A includes a light-emitting element 21. The light-emitting element 21 includes a semiconductor layered body. The semiconductor layered body includes, for example, a substrate such as sapphire or gallium nitride, an n-type semiconductor layer disposed on the substrate, a p-type semiconductor layer, and a light-emitting layer sandwiched therebetween. Further, the light-emitting element 21 includes an n-side electrode electrically connected to the n-type semiconductor layer, and a p-side electrode electrically connected to the p-type semiconductor layer. Furthermore, the light source 20A includes a pair of positive and negative electrodes 25 disposed on a lower surface side. One of the pair of electrodes 25 is electrically connected to the p-side electrode, and the other is electrically connected to the n-side electrode.

The semiconductor layered body from which the substrate is eliminated may be used. Further, a structure of the light-emitting layer may be a structure including a single active layer such as a double heterostructure and a single quantum well (SQW) structure, or a structure including an active layer group such as a multiple quantum well (MQW) structure. The light-emitting layer can emit visible light or ultraviolet light. The light-emitting layer can emit light as visible light from blue to red. As the semiconductor layered body including such a light-emitting layer, for example, $In_xAl_yGa_{1-x-y}N$ ($0 \leq x$, $0 \leq y$, $x+y \leq 1$) can be included. The semiconductor layered body can include at least one light-emitting layer that can achieve the light emission described above. For example, the semiconductor layered body may have a structure including one or more light-emitting layers between the n-type semiconductor layer and the p-type semiconductor layer, or may have a structure in which a structure including the n-type semiconductor layer, the light-emitting layer, and the p-type semiconductor layer in order is repeated multiple times. When the semiconductor layered body includes the plurality of light-emitting layers, the semiconductor layered body may include the light-emitting layers having different light emission peak wavelengths, or may include the light-emitting layers having the same light emission peak wavelength. Note that the same light emission peak wavelength may have a variation of approximately several nm, for example. A combination of such light-emitting layers can be selected as appropriate, and, for example, when the semiconductor layered body includes two light-emitting layers, the light-emitting layers can be selected from combinations of blue light and blue light, green light and green light, red light and red light, ultraviolet light and ultraviolet light, blue light and green light, blue light and red light, green light and red light, and the like. The light-emitting layer may include a plurality of active layers having different light emission peak wavelengths, or may include a plurality of active layers having the same light emission peak wavelength.

Figure 3:
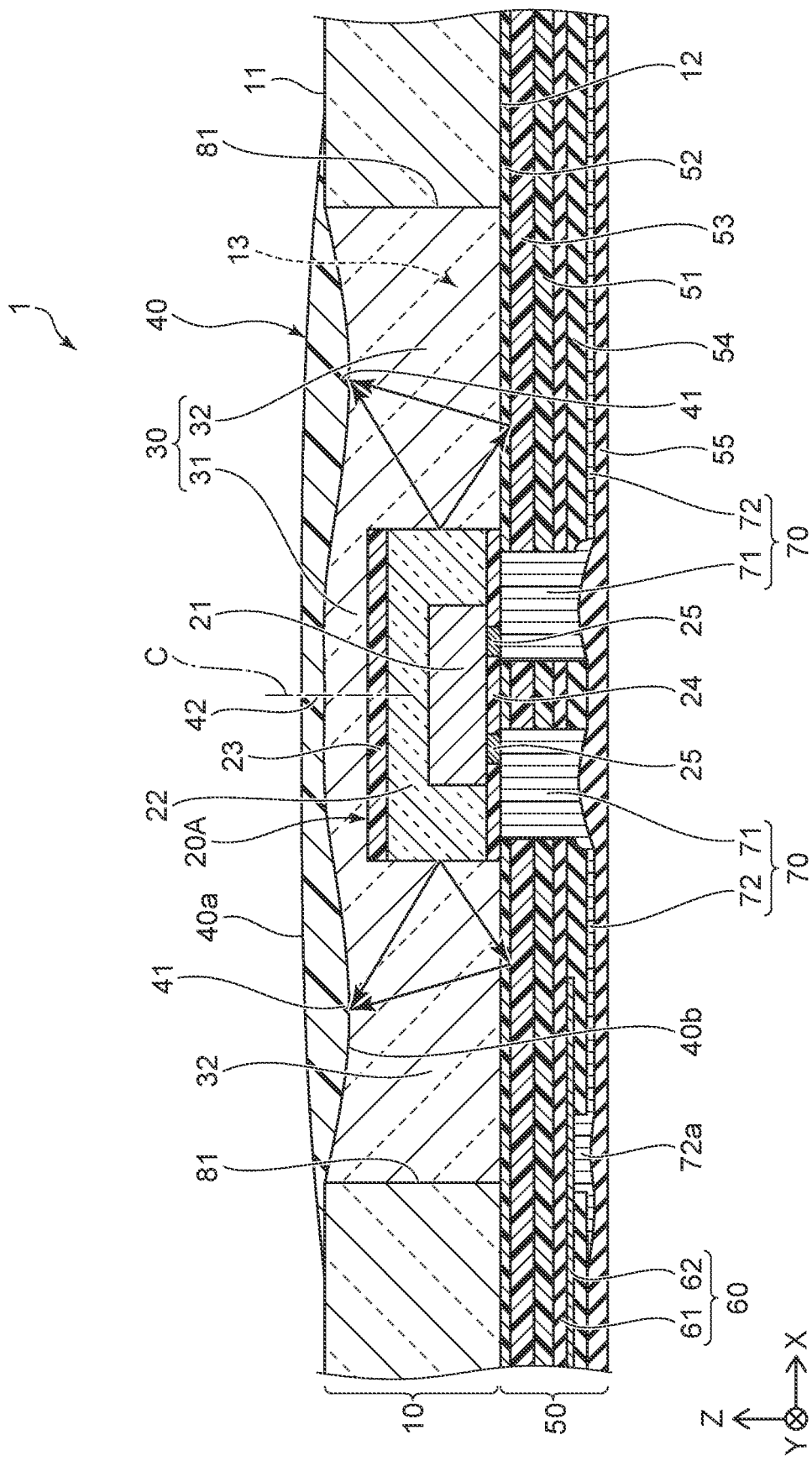
FIG. 3 is a schematic cross-sectional view illustrating a light source and surroundings thereof in FIG. 2.
Figure 4A:
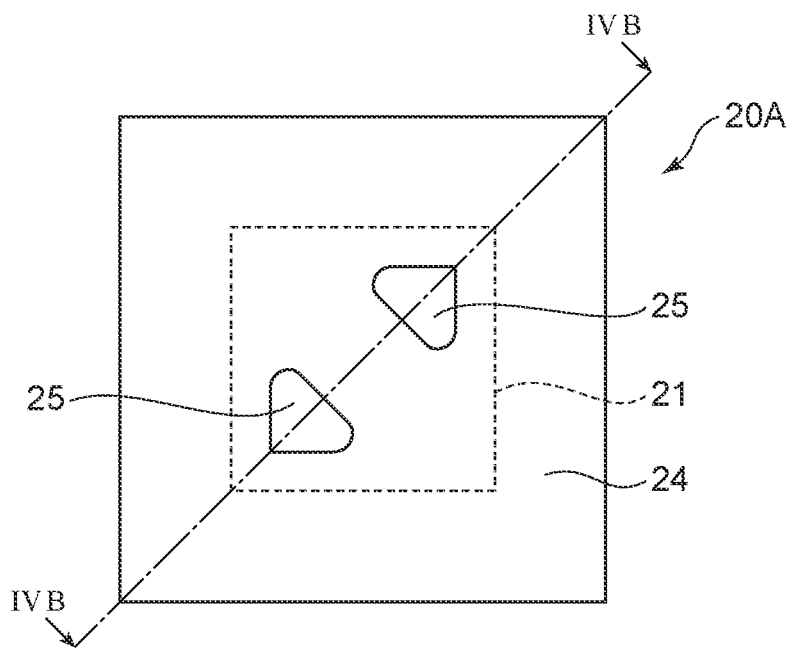
FIG. 4A is a schematic bottom view of the light source according to the embodiments.
Figure 4B:
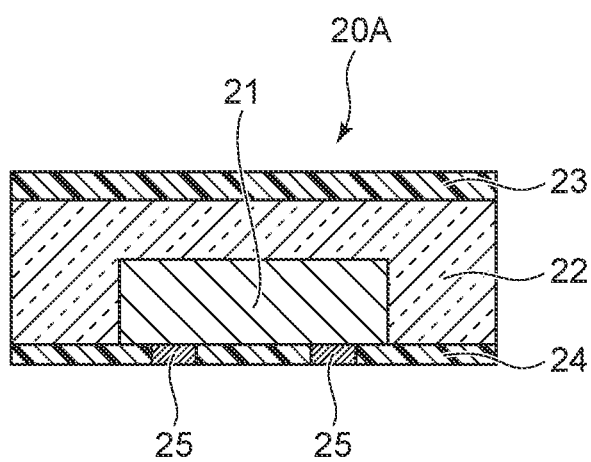
FIG. 4B is a schematic cross-sectional view taken along a line IVB-IVB in FIG. 4A.
Figure 4C:
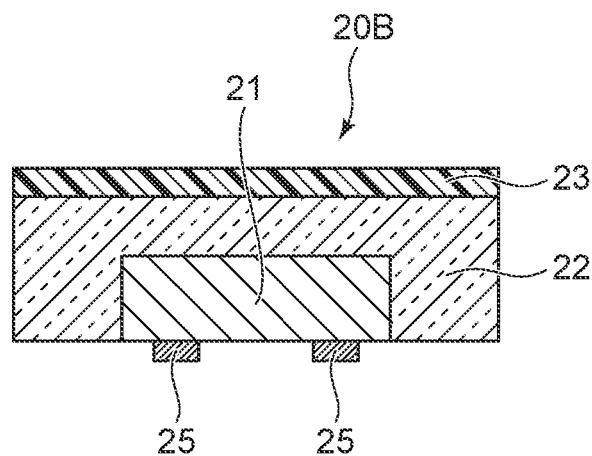
FIG. 4C is a schematic cross-sectional view illustrating a first modified example of the light source according to the embodiments.

As illustrated in FIGS. 3 to 4B, the light source 20A can further include a second light-transmissive member 22. The second light-transmissive member 22 covers an upper surface and a lateral surface of the light-emitting element 21. The second light-transmissive member 22 protects the light-emitting element 21, and also has functions such as wavelength conversion and light diffusion according to particles added to the second light-transmissive member 22.

For example, the second light-transmissive member 22 includes a light-transmissive resin, and may further include a phosphor. For example, a silicone resin, an epoxy resin, or the like can be used as the light-transmissive resin. Further, as the phosphor, an yttrium aluminum garnet based phosphor (for example, $Y_3(Al,Ga)_5O_{12}$:Ce), a lutetium aluminum garnet based phosphor (for example, $Lu_3(Al,Ga)_5O_{12}$:Ce), a terbium aluminum garnet based phosphor (for example, $Tb_3(Al,Ga)_5O_{12}$:Ce), a CCA based phosphor (for example, $Ca_{10}(PO_4)_6Cl_2$:Eu), an SAE based phosphor (for example, $Sr_4Al_{14}O_{25}$:Eu), a chlorosilicate based phosphor (for example, $Ca_8MgSi_4O_{16}Cl_2$:Eu), a β-SiAlON based phosphor (for example, $(Si,Al)_3(O,N)_4$:Eu), an α-SiAlON based phosphor (for example, $Ca(Si,Al)_{12}(O,N)_{16}$:Eu), an SLA based phosphor (for example, $SrLiAl_3N_4$:Eu), a nitride based phosphor such as a CASN based phosphor (for example, $CaAlSiN_3$:Eu) or an SCASN based phosphor (for example, $(Sr,Ca)AlSiN_3$:Eu), a fluoride phosphor such as a KSF based phosphor (for example, $K_2SiF_6$:Mn), a KSAF based phosphor (for example, $K_2Si_{0.99}Al_{0.01}F_{5.99}$:Mn), or an MGF based phosphor (for example, $3.5MgO \cdot 0.5MgF_2 \cdot GeO_2$:Mn), a phosphor having a perovskite structure (for example, $CsPb(F,Cl,Br,I)_3$), a quantum dot phosphor (for example, CdSe, InP, $AgInS_2$, or $AgInSe_2$), or the like can be used. As the phosphor added to the second light-transmissive member 22, one kind of a phosphor may be used, or a plurality of kinds of phosphors may be used.

The KSAF based phosphor may have a composition represented by Formula (I) below.

$$M_2[Si_pAl_qMn_rF_s] \quad (I)$$

In Formula (I), M represents an alkali metal and may include at least K. Mn may be a tetravalent Mn ion. p, q, r, and s may satisfy $0.9 \leq p+q+r \leq 1.1$, $0 < q \leq 0.1$, $0 < r \leq 0.2$, $5.9 \leq s \leq 6.1$. Preferably $0.95 \leq p+q+r \leq 1.05$ or $0.97 \leq p+q+r \leq 1.03$, $0 < q \leq 0.03$, $0.002 \leq q \leq 0.02$ or $0.003 \leq q \leq 0.015$, $0.005 \leq r \leq 0.15$, $0.01 \leq r \leq 0.12$ or $0.015 \leq r \leq 0.1$, $5.92 \leq s \leq 6.05$ or $5.95 \leq s \leq 6.025$. Examples thereof include compositions represented by $K_2[Si_{0.946}Al_{0.005}Mn_{0.049}F_{5.995}]$, $K_2[Si_{0.942}Al_{0.008}Mn_{0.050}F_{5.992}]$, $K_2[Si_{0.939}Al_{0.014}Mn_{0.047}F_{5.986}]$. According to such a KSAF based phosphor, it is possible to obtain red light emission having a high luminance and a narrow half-value width of the light emission peak wavelength.

Further, a wavelength conversion sheet containing the phosphor described above may be disposed on the planar light source 1. Because the wavelength conversion sheet absorbs some of blue light from the light source 20A and emits yellow light, green light, and/or red light, the planar light source 1 that emits white light can be achieved. For example, white light can be acquired by combining the light source 20A that can emit blue light and the wavelength conversion sheet containing the phosphor that can emit yellow light. In addition, the light source 20A that can emit blue light and the wavelength conversion sheet containing a red phosphor and a green phosphor may be combined. Further, the light source 20A that can emit blue light and a plurality of wavelength conversion sheets may be combined. As the plurality of wavelength conversion sheets, for example, the wavelength conversion sheet containing the phosphor that can emit red light and the wavelength conversion sheet containing the phosphor that can emit green light can be selected. Further, the light source 20A including the light-emitting element 21 that can emit blue light and the second light-transmissive member 22 containing the phosphor that can emit red light may be combined with the wavelength conversion sheet containing the phosphor that can emit green light.

As a yellow phosphor used in the wavelength conversion sheet, the yttrium aluminum garnet based phosphor is preferably used, for example. Further, as a green phosphor used in the wavelength conversion sheet, for example, the phosphor having the perovskite structure or the quantum dot phosphor described above with a narrow half-value width of a light emission peak wavelength is preferably used. Further, as a red phosphor used in the wavelength conversion sheet, for example, the KSF based phosphor, the KSAF based phosphor, or the quantum dot phosphor described above with a narrow half-value width of a light emission peak wavelength is preferably used, similarly to the green phosphor.

The light source 20A can further include a covering member 24. The covering member 24 is disposed on a lower surface of the light-emitting element 21. The covering member 24 is disposed such that a lower surface of the electrodes 25 of the light source 20A is exposed from the covering member 24. The covering member 24 is also disposed on a lower surface of the second light-transmissive member 22 covering the lateral surface of the light-emitting element 21.

The covering member 24 has light reflectivity to the light emitted from the light source 20A. The covering member 24 is, for example, a resin member including light scattering particles. As the light scattering particles of the covering member 24, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As a resin material of the covering member 24, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example.

The light source 20A includes a first light adjustment member 23. The first light adjustment member 23 is disposed on an upper surface of the light source 20A. The first light adjustment member 23 covers the upper surface of the light-emitting element 21. The first light adjustment member 23 is disposed on an upper surface of the second light-transmissive member 22, and controls the amount and an emission direction of light emitted from the upper surface of the second light-transmissive member 22. The first light adjustment member 23 has light reflectivity and is light-transmissive to light emitted from the light-emitting element 21. A part of the light emitted from the upper surface of the second light-transmissive member 22 is reflected by the first light adjustment member 23, and another part thereof is transmitted through the first light adjustment member 23. A transmittance of the first light adjustment member 23 with respect to the light emitted from the light-emitting element 21 is preferably in a range from 1% to 50% and more preferably in a range from 3% to 30%, for example. In this way, luminance directly above the light source 20A is reduced, and luminance unevenness of the planar light source 1 is reduced.

The first light adjustment member 23 can be formed of a light-transmissive resin and light scattering particles included in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. The first light adjustment member 23 may be, for example, a metal member such as aluminum or silver, or a dielectric multi-layer film.

In other embodiments, the light source does not include the covering member 24. For example, a light source 20B illustrated in FIG. 4C includes a lower surface formed of the lower surface of the light-emitting element 21 and the lower surface of the second light-transmissive member 22.

Figure 4D:
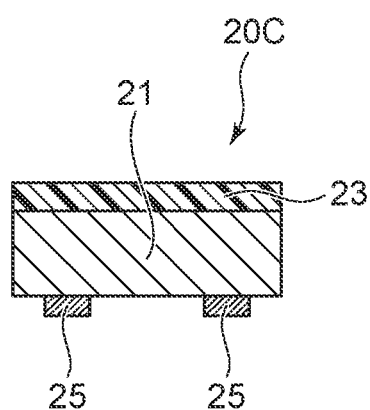
FIG. 4D is a schematic cross-sectional view illustrating a second modified example of the light source according to the embodiments.

Further, as illustrated in FIG. 4D, a light source 20C may be the light-emitting element 21 alone. The first light adjustment member 23 is disposed on the upper surface of the light-emitting element 21. In the light source 20C, the covering member 24 is not disposed on the lower surface of the light-emitting element 21, but in other embodiments, the covering member 24 may be disposed on the lower surface of the light-emitting element 21.

First Light-transmissive Member

The first light-transmissive member 30 is light-transmissive to the light emitted from the light source 20A. A transmittance of the first light-transmissive member 30 with respect to a peak wavelength of the light source 20A is preferably equal to or greater than 50% and more preferably equal to or greater than 70%, for example. For example, a resin can be used as a material of the first light-transmissive member 30. For example, as the material of the first light-transmissive member 30, the same resin as the material of the light guide member 10 or a resin having a small difference in refractive index from the material of the light guide member 10 can be used.

The first light-transmissive member 30 may be formed of a single layer or may be formed of a layered body of a plurality of layers in the third direction Z. The first light-transmissive member 30 may contain a phosphor or light scattering particles. When the first light-transmissive member 30 is a layered body, each layer may or may not contain a phosphor and/or light scattering particles. For example, the first light-transmissive member 30 may be formed of a layer containing a phosphor and a layer that does not contain a phosphor.

The first light-transmissive member 30 is disposed between a lateral surface of the light source 20A in the first hole 13 of the light guide member 10 and the light guide member 10, and is disposed on the light source 20A. The first light-transmissive member 30 covers the upper surface and the lateral surface of the light source 20A. The first light-transmissive member 30 is preferably in contact with the light guide member 10 and the light source 20A. In this way, the light from the light source 20A is easily guided to the light guide member 10.

The first light-transmissive member 30 includes a first light-transmissive portion 31 located on the upper portion of the first light adjustment member 23 of the light source 20A, and a second light-transmissive portion 32 located between the lateral surface of the light source 20A and the light guide member 10.

Second Light Adjustment Member

The second light adjustment member 40 is disposed on the first light-transmissive member 30. As illustrated in FIG. 1, the second light adjustment member 40 is disposed in a position overlapping the first hole 13 in which the light source 20A and the first light-transmissive member 30 are disposed in the top view.

The second light adjustment member 40 has light reflectivity and is light-transmissive to the light emitted from the light source 20A. A transmittance of the second light adjustment member 40 with respect to a peak wavelength of the light source 20A is preferably in a range from 1% to 50% and more preferably in a range from 3% to 30%, for example.

The second light adjustment member 40 can be formed of a light-transmissive resin and light scattering particles contained in the light-transmissive resin. As the light-transmissive resin, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. The second light adjustment member 40 may be, for example, a metal member made of aluminum or silver, or a dielectric multi-layer film.

An upper surface 40a of the second light adjustment member 40 functions as a light-emitting surface (light exit surface) of the planar light source 1 together with the first surface 11 of the light guide member 10. The second light adjustment member 40 reflects a part of the light heading upward above the first hole 13 in which the light source 20A is disposed, and transmits another part thereof. In this way, in the light-emitting surface of the planar light source 1, a difference between luminance of a region directly above and around the light source 20A and luminance of another region can be reduced. In this way, luminance unevenness in the light-emitting surface of the planar light source 1 can be reduced.

The first light-transmissive portion 31 of the first light-transmissive member 30 is disposed between the second light adjustment member 40 and the first light adjustment member 23 of the light source 20A. The first light-transmissive member 30 has a higher transmittance with respect to the light emitted from the light source 20A than a transmittance of the first light adjustment member 23 and the second light adjustment member 40. The transmittance of the first light-transmissive member 30 with respect to the light emitted from the light source 20A can be set in a range from twice to 100 times the transmittance of the first light adjustment member 23 and the transmittance of the second light adjustment member 40 in a range of equal to or less than 100%. Light emitted from the lateral surface of the light source 20A, light reflected by a light reflective member 53, and the like are guided into the first light-transmissive portion 31 between the second light adjustment member 40 and the first light adjustment member 23. In this way, a region directly above the light source 20A is not too bright and not too dark. As a result, luminance unevenness in the light-emitting surface of the planar light source 1 can be reduced.

In order to suppress the region directly above the light source 20A from becoming too bright, the light source 20A includes the first light adjustment member 23 on the upper surface of the light source 20A. A light adjustment member is not disposed on the lateral surface of the light source 20A in order to easily spread the light from the light source 20A in a lateral direction (a direction orthogonal or inclined with respect to the third direction Z) of the light guide member 10. Therefore, luminance of a peripheral region of the light source 20A is more likely to be greater than luminance of the region directly above the light source 20A above the first hole 13.

According to the present embodiment, as illustrated in FIG. 3, the second light adjustment member 40 has a portion 41 having a maximum thickness on a portion located on the second light-transmissive portion 32 around the light source 20A in the cross-sectional view. With a greater thickness of the second light adjustment member 40, the amount of light transmitted through the second light adjustment member 40 further decreases. Therefore, for the light emitted upward from the lateral surface of the light source 20A and the light reflected upward by the light reflective member 53, the amount of the light transmitted through the second light adjustment member 40 can be reduced around the light source 20A. As a result, a difference in luminance between the region directly above and the region around the light source 20A can be reduced, and luminance unevenness in the light-emitting surface of the planar light source 1 can be reduced.

Note that, in the present specification, the cross-sectional view is not limited to the cross-sectional view parallel to an X-Z plane as illustrated in FIG. 3, and represents any cross-sectional view that is perpendicular to the first surface 11 and parallel to the third direction Z.

For example, in the cross-sectional view, a thickness of the second light adjustment member 40 increases from a portion located above a boundary between the lateral surface of the light source 20A and the first light-transmissive member 30 toward the portion 41 having the maximum thickness, and decreases from the portion 41 having the maximum thickness toward a portion located above a boundary 81 between the first light-transmissive member 30 and the light guide member 10. In the cross-sectional view, a lower surface 40b of the second light adjustment member 40 on the second light-transmissive portion 32 forms a curved line being convex downward.

In the second light adjustment member 40, the thickness of the portion located above the boundary between the lateral surface of the light source 20A and the first light-transmissive member 30 is set to be less than the thickness of the portion 41 having the maximum thickness, and thus a decrease in the amount of the light traveling from the periphery of the light source 20A into the first light-transmissive portion 31 between the first light adjustment member 23 and the second light adjustment member 40 can be suppressed. In this way, the region directly above the light source 20A can be suppressed from becoming too dark, and luminance unevenness in the light-emitting surface of the planar light source 1 can be reduced.

In the second light adjustment member 40, the thickness of the portion located above the boundary 81 between the first light-transmissive member 30 and the light guide member 10 is set to be less than the thickness of the portion 41 having the maximum thickness, and thus a decrease in the amount of the light extracted from the first surface 11 of the light guide member 10 surrounding the first hole 13 in the top view can be suppressed, and luminance unevenness in the light-emitting surface of the planar light source 1 can be reduced.

In the second light adjustment member 40, the thickness of a portion 42 located on an axis C passing through the center of the upper surface of the light source 20A is preferably in a range from 30% to 95% of the maximum thickness. In this way, in the light-emitting surface of the planar light source 1, a difference in luminance between the region directly above and the region around the light source 20A can be reduced, and luminance unevenness can be reduced.

At the boundary 81 between the first light-transmissive member 30 and the light guide member 10, reflection and refraction of light may occur, and light heading upward may increase, according to a difference in refractive index between the first light-transmissive member 30 and the light guide member 10. In other words, luminance in the vicinity of an upper end of the boundary 81 between the first light-transmissive member 30 and the light guide member 10 may increase. In this case, disposing the second light adjustment member 40 so as to cover the upper end of the boundary 81 between the first light-transmissive member 30 and the light guide member 10 can reduce the luminance in the vicinity of the upper end of the boundary 81 therebetween, and thus luminance unevenness in the light-emitting surface of the planar light source 1 can be reduced.

Note that, when a distance between the lateral surface of the light source 20A and the boundary 81 is increased, an increase in luminance in the vicinity of the upper end of the boundary 81 may be suppressed. In this case, the second light adjustment member 40 may not cover the upper end of the boundary 81 between the first light-transmissive member 30 and the light guide member 10. In other words, the second light adjustment member 40 may fit in the first hole 13 in the top view.

An optical sheet (such as a prism sheet and a light diffusion sheet) can be disposed on the light-emitting surface of the planar light source 1. In this case, when the upper surface 40a of the second light adjustment member 40 is made to be a convex surface, a contact area between the optical sheet and the upper surface 40a of the second light adjustment member 40 can be reduced as compared with a case of a flat surface. This can suppress bonding of the planar light source 1 and the optical sheet together.

Because the first light adjustment member 23 suppresses transmission of a part of the light emitted in a directly upward direction from the light source 20A, the transmittance of the second light adjustment member 40 is preferably higher than the transmittance of the first light adjustment member 23 with respect to the light emitted from the light source 20A in order to suppress the region directly above the light source 20A from becoming too dark.

As illustrated in FIG. 1, in a top view, the second light adjustment member 40 covers the entire light source 20A. This can suppress occurrence of a portion having a locally high luminance in the region directly above the light source 20A in the light-emitting surface of the planar light source 1, and can reduce luminance unevenness in the light-emitting surface of the planar light source 1.

As illustrated in FIG. 3, in the cross-sectional view, the entire lower surface 40b of the second light adjustment member 40 is preferably located above an upper surface of the first light adjustment member 23. In this way, the light traveling from the periphery of the light source 20A into the first light-transmissive portion 31 between the first light adjustment member 23 and the second light adjustment member 40 is less likely to be blocked by the second light adjustment member 40. As a result, the region directly above the light source 20A can be suppressed from becoming too dark, and luminance unevenness in the light-emitting surface of the planar light source 1 can be reduced.

As illustrated in FIG. 3, in the cross-sectional view, the second light-transmissive portion 32 preferably has a recessed portion on the upper surface. The upper surface of the second light-transmissive portion 32 has the recessed portion such that the upper surface of the second light-transmissive portion 32 is recessed closer to the support member 50 side than an upper surface of the first light-transmissive portion 31. The second light adjustment member 40 is disposed in the recessed portion of the upper surface of the second light-transmissive portion 32, and thus a thickness of the second light adjustment member 40 on the second light-transmissive portion 32 can be made greater than a thickness of the second light adjustment member 40 on the first light-transmissive portion 31 while suppressing an increase in height of the upper surface 40a of the second light adjustment member 40 from the first surface 11. As a result, both a reduction in luminance unevenness and a reduction in thickness of the planar light source 1 can be achieved.

In the second light adjustment member 40, a portion thicker than the thickness of the portion 42 located on the axis C passing through the center of the upper surface of the light source 20A preferably surrounds the light source 20A without a gap in the top view. In this way, occurrence of a portion having a high luminance locally around the center of the upper surface of the light source 20A can be suppressed, and luminance unevenness in the light-emitting surface of the planar light source 1 can be reduced.

In the cross-sectional view, the light source 20A is sandwiched between regions of the second light-transmissive portion 32. For example, in the cross-sectional view illustrated in FIG. 3, the regions of the second light-transmissive portion 32 sandwich the light source 20A in the first direction X. In the cross-sectional view, a maximum thickness of the second light adjustment member 40 located on one of the regions of the second light-transmissive portion 32 that sandwich the light source 20A is preferably in a range from 0.9 times to 1.1 times a maximum thickness of the second light adjustment member 40 located on the other region of the second light-transmissive portion 32. In this way, a difference in luminance between the regions sandwiching the light source 20A in the cross-sectional view can be reduced, and luminance unevenness in the light-emitting surface of the planar light source 1 can be reduced.

Support Member

The support member 50 includes a wiring substrate 60. The wiring substrate 60 includes an insulating base material 61, and at least one layer of a first conductive member 62 disposed on at least one surface of the insulating base material 61. The insulating base material 61 may be a rigid substrate, or may be a flexible substrate. The insulating base material 61 is preferably a flexible substrate for reducing a thickness of the planar light source 1. The insulating base material 61 may be formed of a single layer or may be formed of a layered body of a plurality of layers in the third direction Z. For example, the insulating base material 61 may be formed of a single-layer flexible substrate, or may be formed of a layered body of a plurality of rigid substrates. For example, a resin such as a polyimide can be used as a material of the insulating base material 61. The first conductive member 62 is a metal film, for example, a copper film.

The support member 50 further includes a first adhesive layer 51 disposed on the wiring substrate 60, the light reflective member 53 disposed on the first adhesive layer 51, and a second adhesive layer 52 disposed on the light reflective member 53.

The first adhesive layer 51 is disposed on a surface of the insulating base material 61 on an opposite side to the surface on which the first conductive member 62 is disposed. The first adhesive layer 51 is disposed between the insulating base material 61 and the light reflective member 53, and adheres the insulating base material 61 and the light reflective member 53. The first adhesive layer 51 is, for example, a resin member containing light scattering particles. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example. As the resin of the first adhesive layer 51, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example.

The light reflective member 53 is disposed below the second surface 12 of the light guide member 10, below the light source 20A, below the first light-transmissive member 30, and below the groove 14. The light reflective member 53 has light reflectivity to the light emitted from the light source 20A. As the light reflective member 53, a resin member with many foams or a resin member including light scattering particles can be used, for example. As the resin of the light reflective member 53, a thermoplastic resin such as an acrylic resin, a polycarbonate resin, a cyclic polyolefin resin, a polyethylene terephthalate resin, or a polyester resin, or a thermosetting resin such as an epoxy resin or a silicone resin can be used, for example. As the light scattering particles, particles of titania, silica, alumina, zinc oxide, magnesium oxide, zirconia, yttria, calcium fluoride, magnesium fluoride, niobium pentoxide, barium titanate, tantalum pentoxide, barium sulfate, glass, or the like can be used, for example.

In a region between the light reflective member 53 and the first surface 11 of the light guide member 10, the light from the light source 20A is repeatedly reflected by the light reflective member 53 and the first surface 11, and is also guided toward the groove 14 in the light guide member 10. A part of the light toward the first surface 11 is extracted from the first surface 11 to the outside of the light guide member 10. A part of the light toward the second surface 12 is reflected to the first surface 11 side by the light reflective member 53, and thus luminance of the light extracted from the first surface 11 can be improved. Imparting light reflectivity to the first adhesive layer 51 disposed on the lower surface of the light reflective member 53 can further improve luminance of the light extracted from the first surface 11.

The second adhesive layer 52 is disposed between the light reflective member 53 and the second surface 12 of the light guide member 10, and adheres the light reflective member 53 and the light guide member 10. Further, the light source 20A is disposed on the second adhesive layer 52 in the first hole 13 of the light guide member 10. The second adhesive layer 52 is light-transmissive to the light emitted from the light source 20A. As a material of the second adhesive layer 52, an epoxy resin, an acrylic resin, a cyclic polyolefin resin, or the like can be used, for example.

The support member 50 further includes a first insulating layer 54. The first insulating layer 54 is disposed on the surface of the insulating base material 61 of the wiring substrate 60 on which the first conductive member 62 is disposed, and covers the first conductive member 62. As a material of the first insulating layer 54, an epoxy resin, a urethane resin, or an acrylic resin can be used, for example.

The support member 50 further includes a second conductive member 70. The second conductive member 70 includes, for example, a resin and metal particles contained in the resin. As the resin of the second conductive member 70, an epoxy resin or a phenol resin can be used, for example. For example, particles of copper or silver can be used as the metal particles.

The second conductive member 70 includes a connection portion 71 and a wiring portion 72. The connection portion 71 penetrates the second adhesive layer 52, the light reflective member 53, the first adhesive layer 51, the insulating base material 61, and the first insulating layer 54 in the third direction Z. The wiring portion 72 is disposed on a surface of the first insulating layer 54 on an opposite side to a surface facing the wiring substrate 60, and is connected to the connection portion 71. The connection portion 71 and the wiring portion 72 can be integrally formed of the same material, for example. A portion 72a of the wiring portion 72 penetrates the first insulating layer 54, and is connected to the first conductive member 62.

A pair of the second conductive members 70 are separated from each other corresponding to the pair of positive and negative electrodes 25 of the light source 20A. The connection portion 71 of one of the second conductive members 70 is connected to the positive electrode 25 below the light source 20A, and the connection portion 71 of the other second conductive member 70 is connected to the negative electrode 25 below the light source 20A. The electrode 25 of the light source 20A is electrically connected to the second conductive member 70 and the first conductive member 62.

The support member 50 further includes a second insulating layer 55. The second insulating layer 55 is disposed on the surface of the first insulating layer 54 on which the second conductive member 70 is disposed, and covers the second conductive member 70 for protection.

Next, an example of a method for manufacturing the planar light source 1 will be described with reference to FIGS. 5 to 10.

Figure 5:
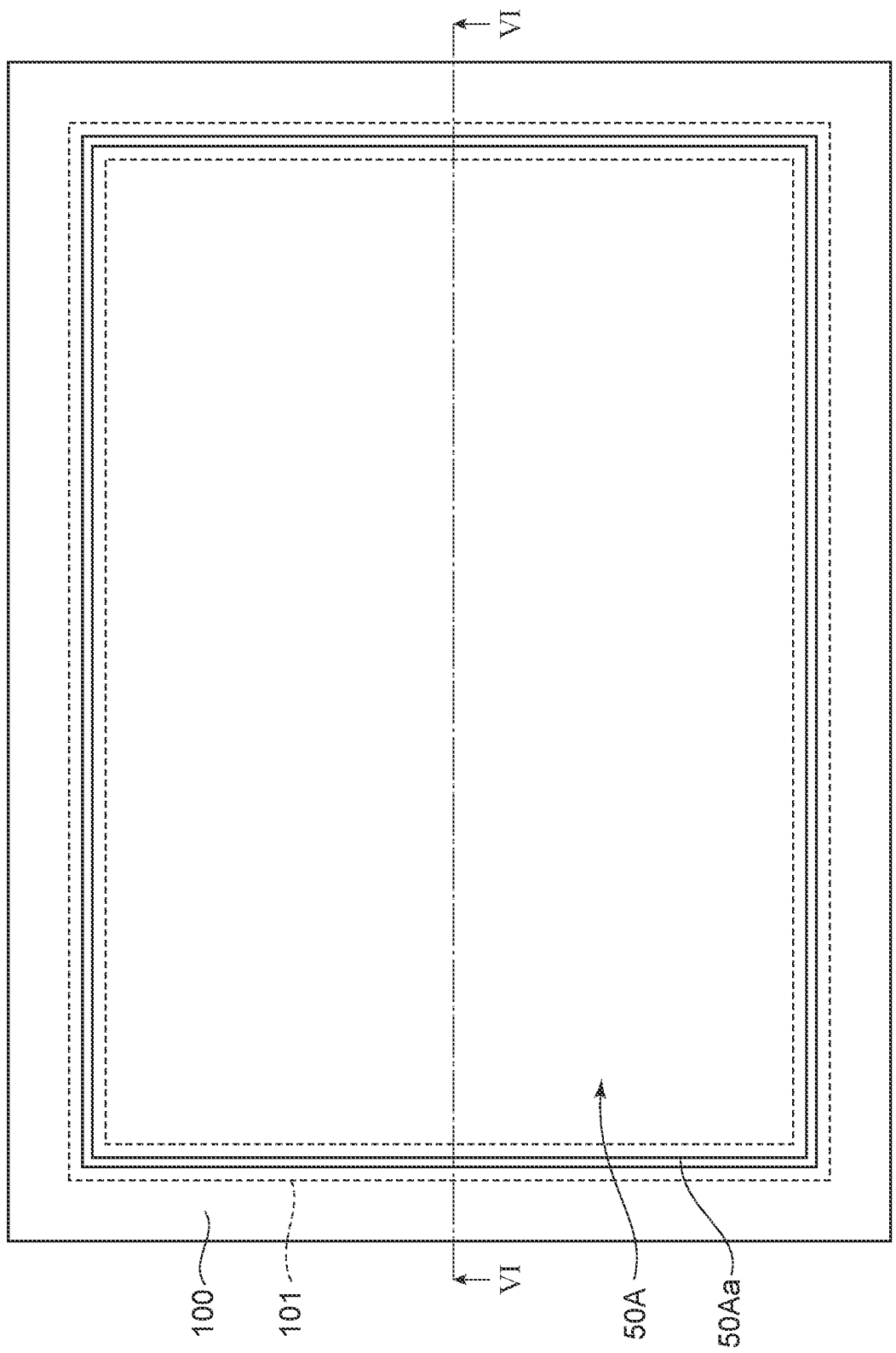
FIG. 5 is a schematic top view illustrating a method for manufacturing the planar light source according to the first embodiment.
Figure 6:
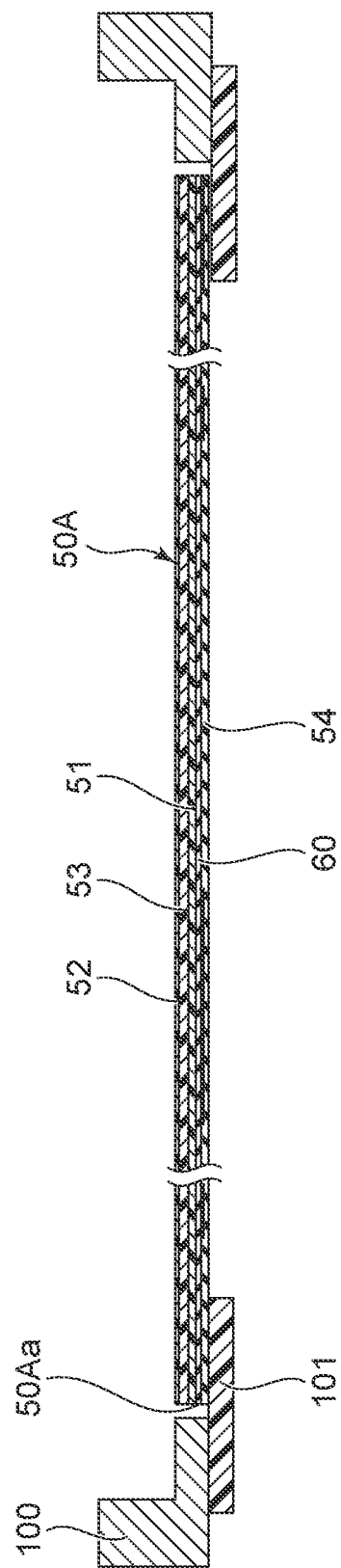
FIG. 6 is a schematic cross-sectional view taken along a line VI-VI in FIG. 5.

As illustrated in FIGS. 5 and 6, a layered sheet 50A is prepared. The layered sheet 50A includes the first insulating layer 54, the wiring substrate 60 disposed on the first insulating layer 54, the first adhesive layer 51 disposed on the wiring substrate 60, the light reflective member 53 disposed on the first adhesive layer 51, and the second adhesive layer 52 disposed on the light reflective member 53. A planar shape of the layered sheet 50A is a rectangle.

A holder 100 is disposed outside the layered sheet 50A. The holder 100 is, for example, a frame member of a metal material. In the top view, the holder 100 surrounds an outer peripheral portion 50Aa of the layered sheet 50A. There is a gap between the outer peripheral portion 50Aa of the layered sheet 50A and the holder 100. A tape 101 is bonded to a lower surface of the layered sheet 50A on the outer peripheral portion 50Aa side and a lower surface of the holder 100, and the layered sheet 50A is held by the holder 100 with the tape 101. In this way, even when the layered sheet 50A is thin and has flexibility, a warp in the layered sheet 50A can be suppressed, and handling is easy. Note that the second adhesive layer 52 may be disposed on the light reflective member 53 after the layered sheet 50A is held by the holder 100.

Figure 7:
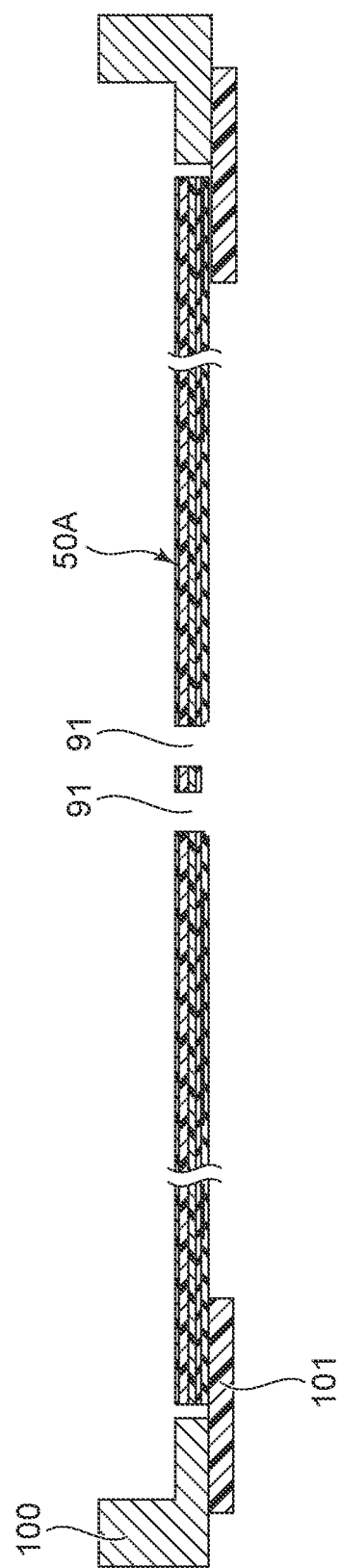
FIG. 7 is a schematic cross-sectional view illustrating the method for manufacturing the planar light source according to the first embodiment.

As illustrated in FIG. 7, in a state where the layered sheet 50A is held by the holder 100, a plurality of connection holes 91 penetrating the layered sheet 50A are formed in the layered sheet 50A. The connection holes 91 are formed by, for example, punching, drilling, or laser processing. A shape of the connection holes 91 in the top view is a circular shape. A shape of the connection holes 91 in the top view may be an elliptical shape or a polygonal shape other than a circular shape.

Figure 8:
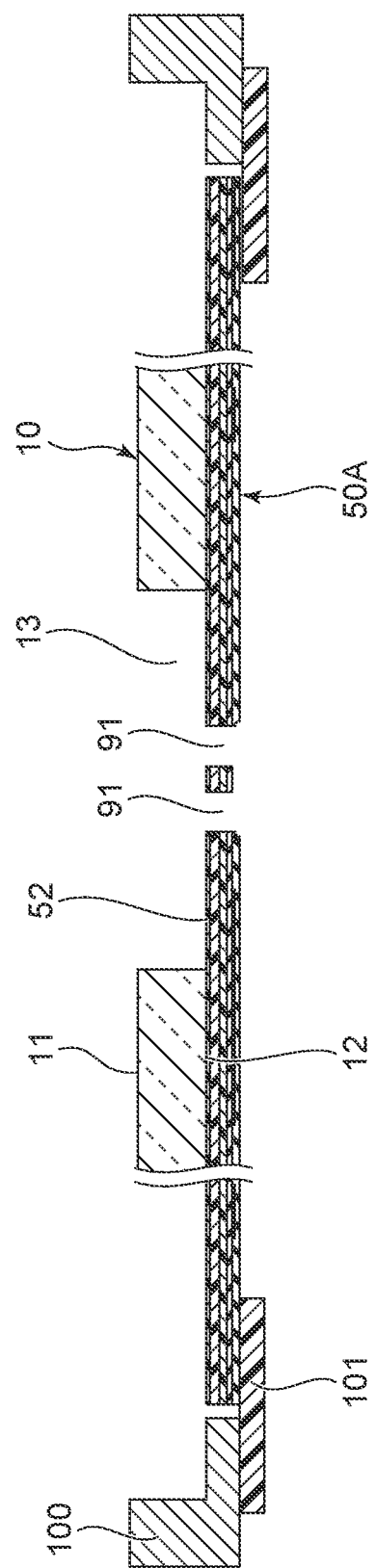
FIG. 8 is a schematic cross-sectional view illustrating the method for manufacturing the planar light source according to the first embodiment.

After the connection holes 91 are formed, the light guide member 10 is disposed on the layered sheet 50A as illustrated in FIG. 8. The second surface 12 of the light guide member 10 adheres to the second adhesive layer 52 of the layered sheet 50A. The connection holes 91 formed in the layered sheet 50A overlap the first hole 13 formed in the light guide member 10. The two connection holes 91 overlap one first hole 13.

Figure 9:
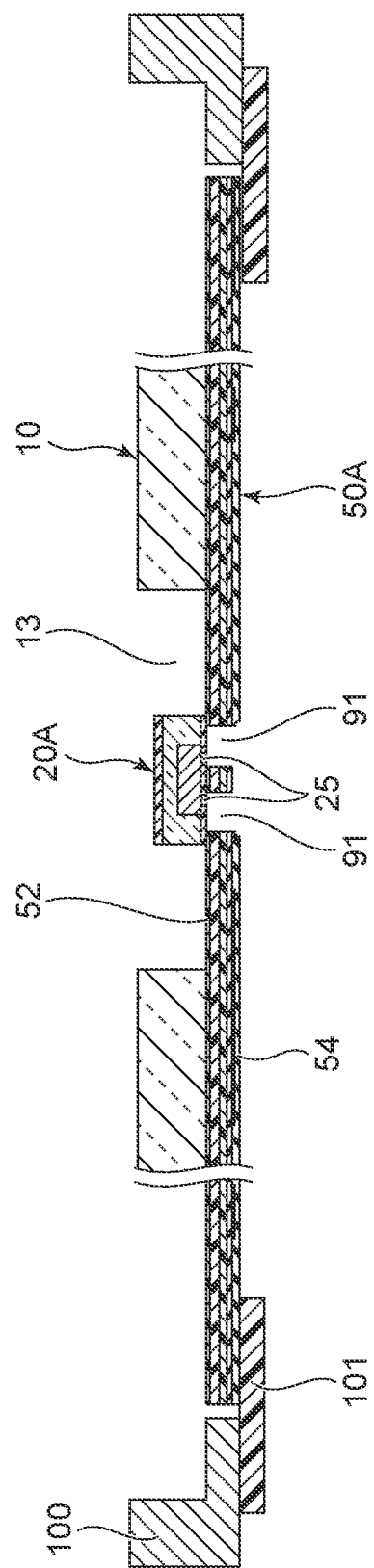
FIG. 9 is a schematic cross-sectional view illustrating the method for manufacturing the planar light source according to the first embodiment.

After the light guide member 10 is disposed on the layered sheet 50A, as illustrated in FIG. 9, the light source 20A is disposed on the layered sheet 50A in the first hole 13. A lower surface of the light source 20A adheres to the second adhesive layer 52. At least a part of the lower surface of each electrode 25 of the light source 20A is exposed to each of the connection holes 91.

Figure 10:
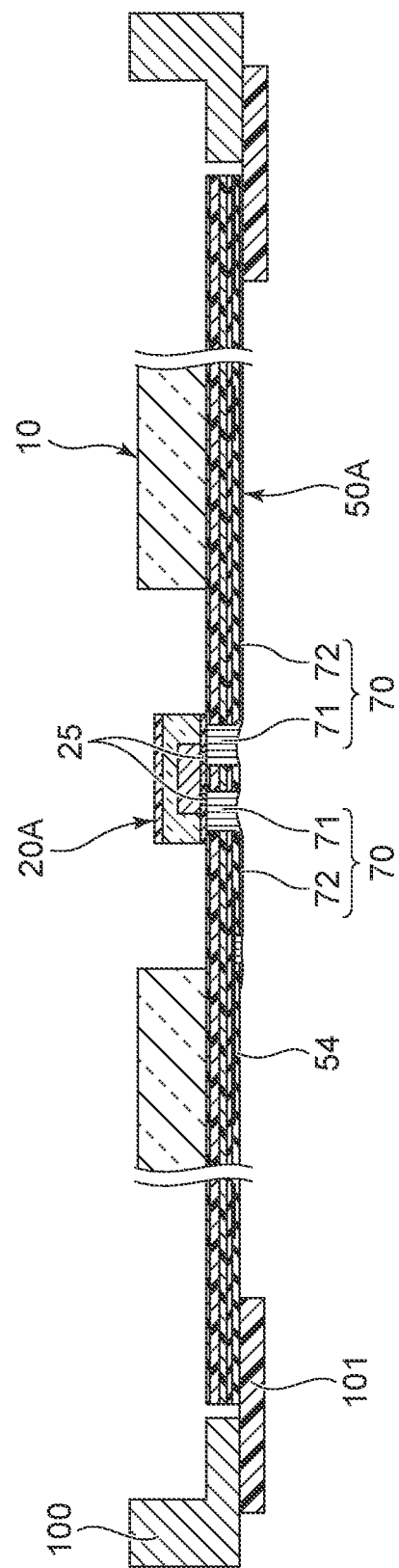
FIG. 10 is a schematic cross-sectional view illustrating the method for manufacturing the planar light source according to the first embodiment.

After the light source 20A is disposed on the layered sheet 50A, conductive paste is formed in the connection holes 91 and on a lower surface of the first insulating layer 54. As illustrated in FIG. 10, the conductive paste is cured to form the second conductive member 70 including the connection portion 71 connected to the electrode 25 of the light source 20A and the wiring portion 72 connected to the connection portion 71 and disposed on the lower surface of the first insulating layer 54.

After the second conductive member 70 is formed, as illustrated in FIG. 3, the second insulating layer 55 is formed on the lower surface of the first insulating layer 54 so as to cover the second conductive member 70. In this way, the support member 50 is obtained.

Furthermore, subsequently, the first light-transmissive member 30 is formed in the first hole 13. The first light-transmissive member 30 is formed so as to cover the lateral surface and the upper surface of the light source 20A. For example, the first light-transmissive member 30 can be formed by supplying a liquid light-transmissive resin into the first hole 13, and then heating and curing the light-transmissive resin. Note that the first light-transmissive member 30 may be formed by dividing the formation into a plurality of times.

After the first light-transmissive member 30 is formed, the second light adjustment member 40 is formed on the first light-transmissive member 30. The second light adjustment member 40 can be formed by a method such as printing, potting, spraying, ink-jet, and bonding of a resin sheet, for example.

Further, after the light source 20A is turned on and a luminance measurement from the first surface 11 side is performed, the second light adjustment member 40 may be additionally formed. For example, as a result of the luminance measurement, the second light adjustment member 40 is further formed in a portion that is too bright, and thus luminance unevenness of the planar light source 1 can be reduced.

The method for manufacturing the planar light source 1 described above is an example, and various modifications can be made as long as a technical contradiction does not arise.

Second Embodiment

Figure 11:
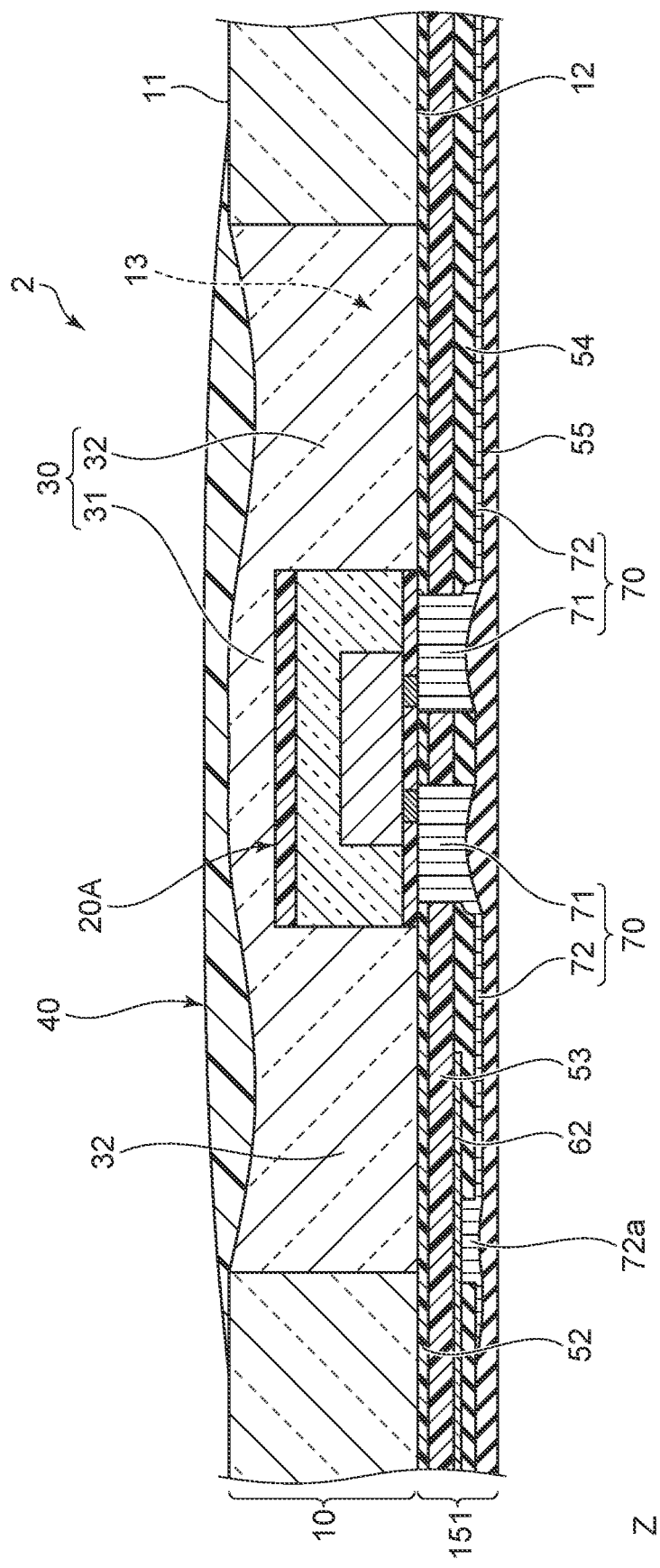
FIG. 11 is a schematic cross-sectional view of a planar light source according to a second embodiment.

FIG. 11 is a schematic cross-sectional view of a portion similar to that in FIG. 3 in a planar light source 2 according to a second embodiment.

In the second embodiment, a configuration of a support member 151 is different from the configuration of the support member 50 according to the first embodiment. The support member 151 does not include the insulating base material 61 and the first adhesive layer 51. The support member 151 includes a second insulating layer 55, a first insulating layer 54 disposed on the second insulating layer 55, a light reflective member 53 disposed on the first insulating layer 54, and a second adhesive layer 52 disposed on the light reflective member 53. A first conductive member 62 is disposed on the light reflective member 53, and the first insulating layer 54 covers the first conductive member 62.

The support member 151 that does not include the insulating base material 61 and the first adhesive layer 51 can be made thinner than the support member 50 according to the first embodiment. In this way, the planar light source 2 can be made thinner.

Third Embodiment

Figure 12:
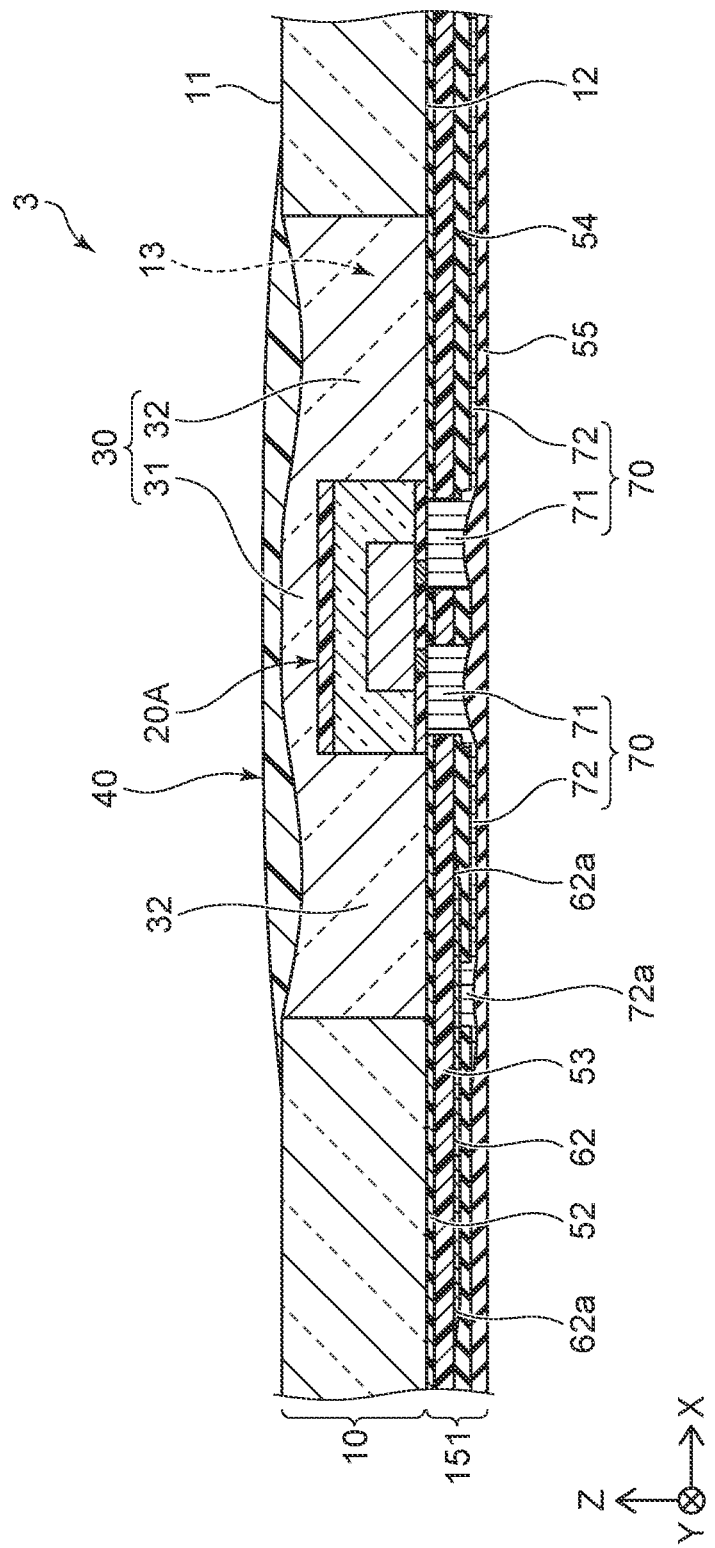
FIG. 12 is a schematic cross-sectional view of a planar light source according to a third embodiment.

FIG. 12 is a schematic cross-sectional view of a portion similar to that in FIG. 3 in a planar light source 3 according to a third embodiment.

The planar light source 3 according to the third embodiment also includes a support member 151 that does not include the insulating base material 61 and the first adhesive layer 51, and thus the planar light source 3 can be made thin.

Further, a surface of an end portion 62a of a first conductive member 62 is inclined with respect to a surface of a portion of the first conductive member 62 other than the end portion 62a, and a thickness of the end portion 62a is thinner than a thickness of the portion other than the end portion 62a. In this way, the adhesion between the first conductive member 62 and a first insulating layer 54 can be increased. The end portion 62a is a portion in a range from 10 μm to 250 μm, for example, from an end of the first conductive member 62.

Fourth Embodiment

Figure 13:
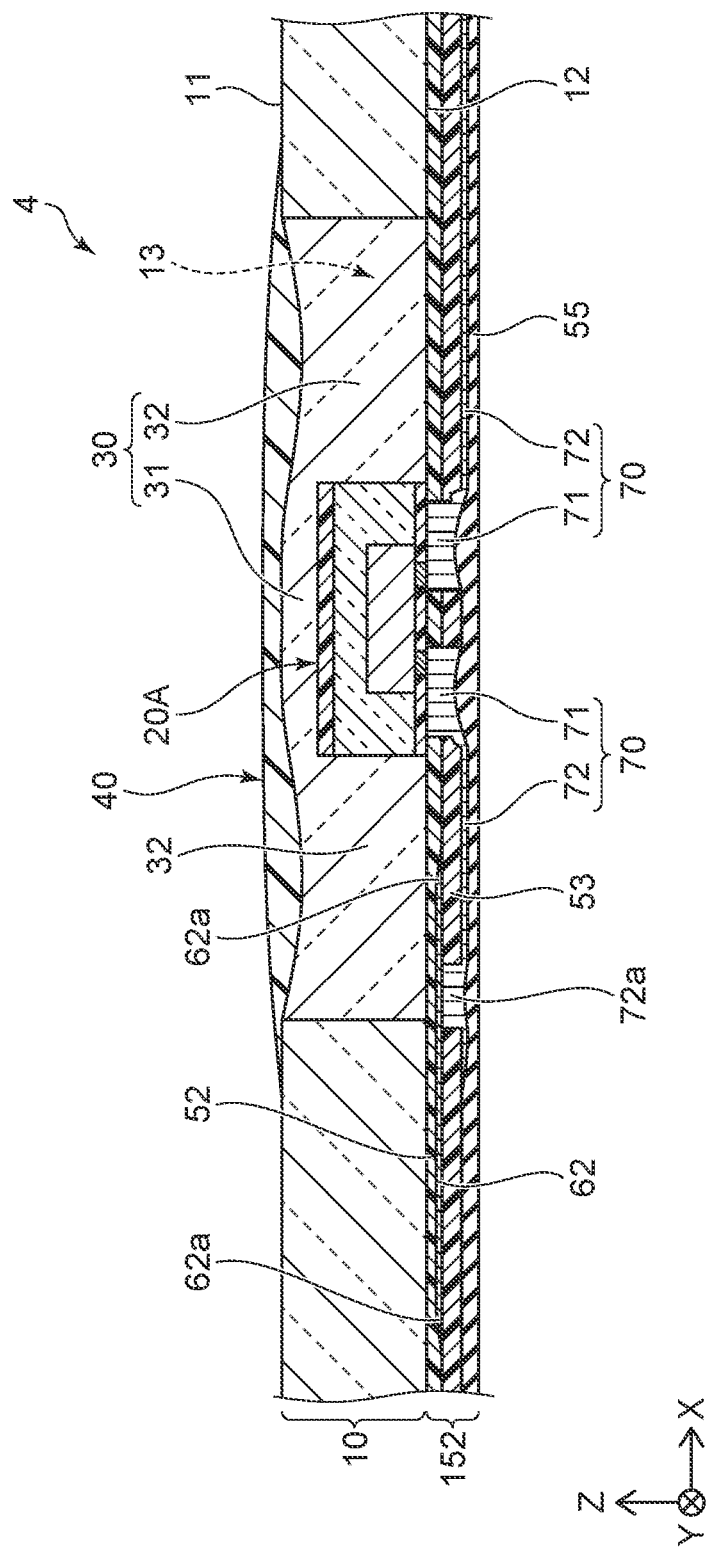
FIG. 13 is a schematic cross-sectional view of a planar light source according to a fourth embodiment.

FIG. 13 is a schematic cross-sectional view of a portion similar to that in FIG. 3 in a planar light source 4 according to a fourth embodiment.

A support member 152 of the planar light source 4 according to the fourth embodiment does not include the insulating base material 61 and the first adhesive layer 51, and does not also include the first insulating layer 54. In this way, the planar light source 4 according to the fourth embodiment can be made even thinner.

The support member 152 includes a second insulating layer 55, a light reflective member 53 disposed on the second insulating layer 55, and a second adhesive layer 52 disposed on the light reflective member 53.

A first conductive member 62 is located between the light reflective member 53 and the second adhesive layer 52. A wiring portion 72 of a second conductive member 70 is located between the light reflective member 53 and the second insulating layer 55. A portion 72a of the wiring portion 72 penetrates the light reflective member 53, and is connected to the first conductive member 62.

Fifth Embodiment

Figure 14:
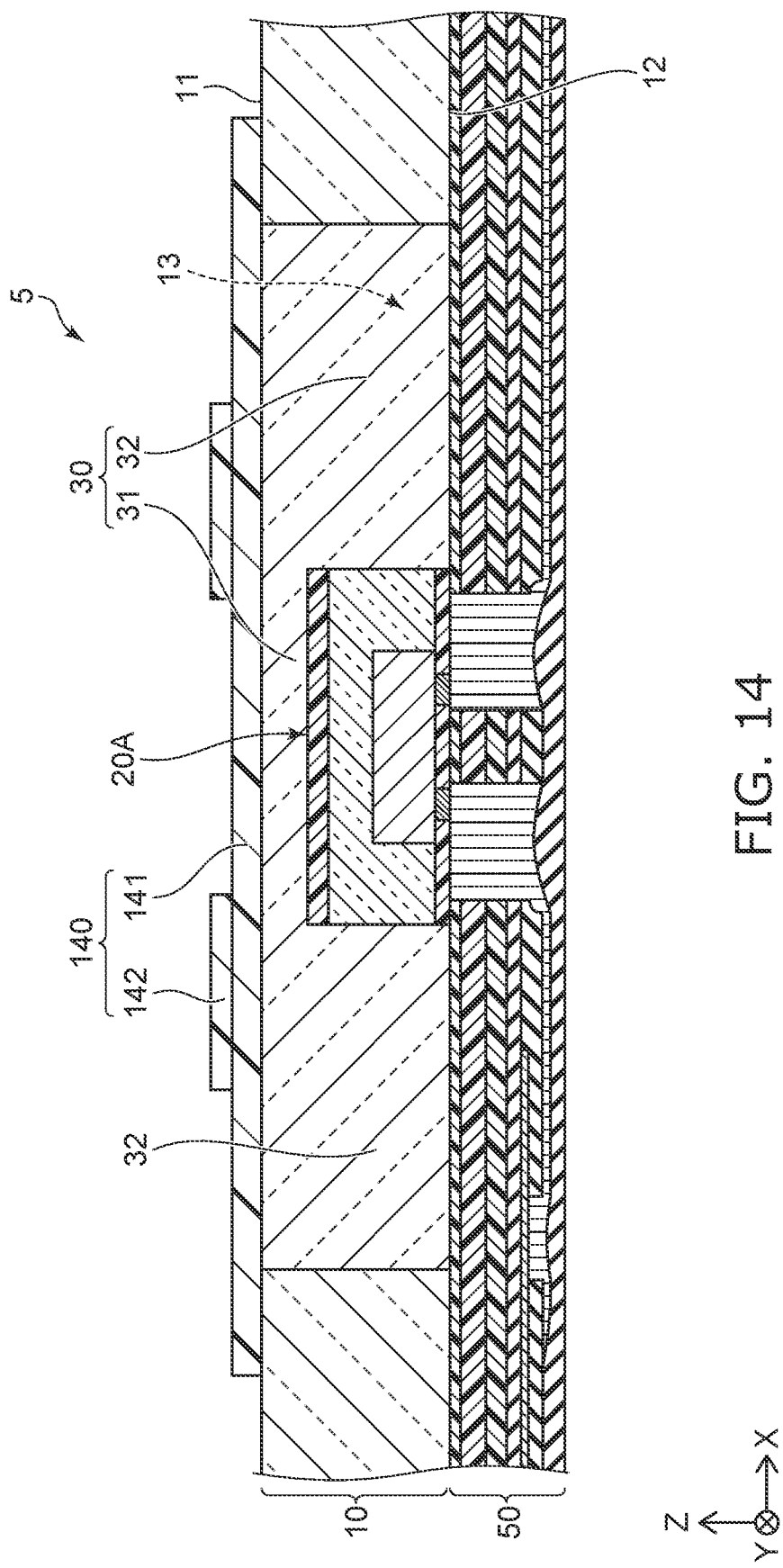
FIG. 14 is a schematic cross-sectional view of a planar light source according to a fifth embodiment.

FIG. 14 is a schematic cross-sectional view of a portion similar to that in FIG. 3 in a planar light source 5 according to a fifth embodiment.

In the planar light source 5 according to the fifth embodiment, an upper surface of a first light-transmissive member 30 is a flat surface. A second light adjustment member 140 is disposed on the flat surface of the first light-transmissive member 30. The second light adjustment member 140 can be formed of the same material as the material of the second light adjustment member 40 according to the first embodiment.

The second light adjustment member 140 includes a first portion 141 disposed on the upper surface of the first light-transmissive member 30, and a second portion 142 disposed on the first portion 141. For example, in the top view, the second portion 142 is in an annular shape including polygonal annular shape.

At least a part of the second portion 142 is located on a second light-transmissive portion 32 of the first light-transmissive member 30. In the second light adjustment member 140, a portion where the second portion 142 is disposed (a layered portion of the first portion 141 and the second portion 142) is thicker than a portion where the second portion 142 is not disposed (a portion of only the first portion 141). Therefore, the second light adjustment member 140 has a portion having a maximum thickness on a portion located on the second light-transmissive portion 32 around a light source 20A in the cross-sectional view. In this way, a difference in luminance between a region directly above and the region around the light source 20A can be reduced, and luminance unevenness in a light-emitting surface of the planar light source 5 can be reduced.

Sixth Embodiment

Figure 15:
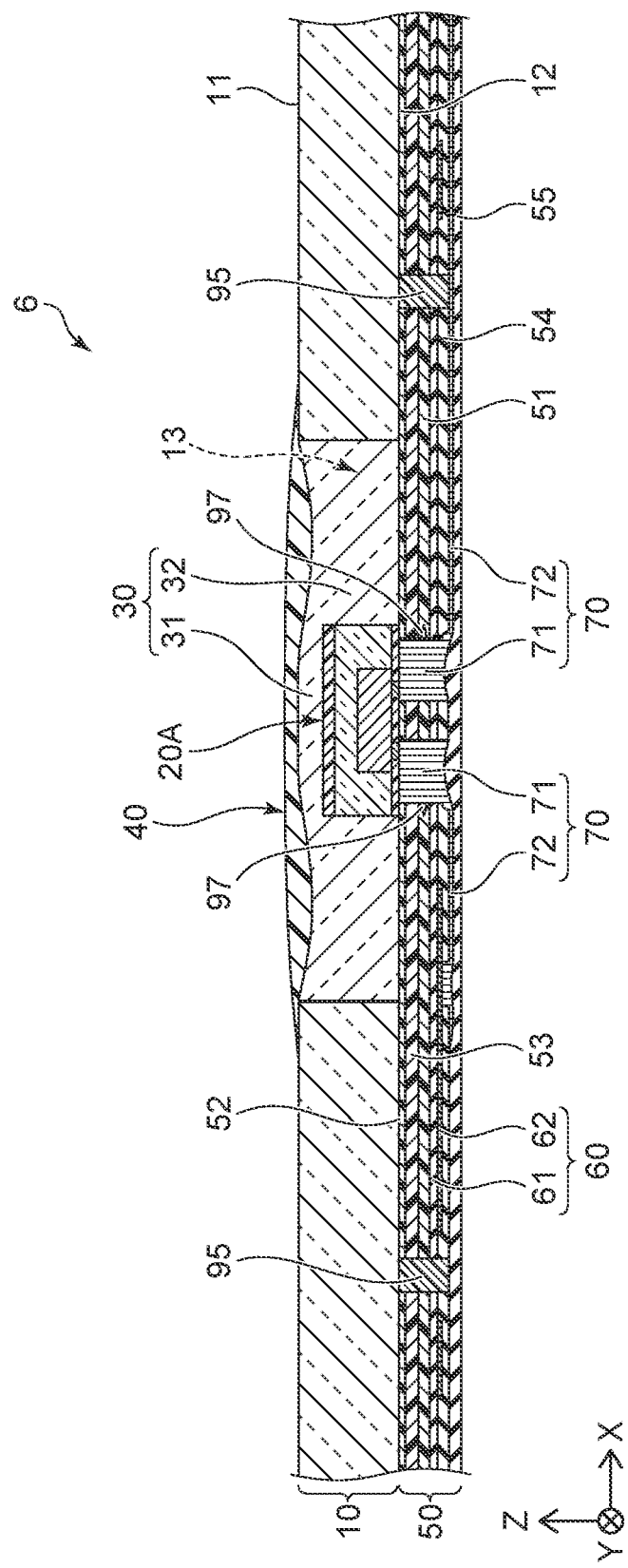
FIG. 15 is a schematic cross-sectional view of a planar light source according to a sixth embodiment.

FIG. 15 is a schematic cross-sectional view of a portion similar to that in FIG. 3 in a planar light source 6 according to a sixth embodiment.

A columnar portion 95 is disposed in a support member 50. The columnar portion 95 can be disposed in a hole formed in a layered sheet 50A simultaneously with connection hole 91 in the step illustrated in FIG. 7 described above. For example, a resin containing light scattering particles can be used as a material of the columnar portion 95. After the columnar portion 95 is disposed in the layered sheet 50A, the processing proceeds to the steps in FIGS. 8 to 10. Even when a heating step is included in the step after the columnar portion 95 is disposed, the columnar portion 95 can suppress a misalignment in a lateral direction of each layer constituting the layered sheet 50A. In this way, for example, a positional misalignment between a light source 20A and the connection hole 91, and the like can be suppressed. Note that the columnar portion 95 may penetrate the layered sheet 50A or may not penetrate the layered sheet 50A.

Further, in the planar light source 6 according to the sixth embodiment, a protruding portion 97 is formed on an outer peripheral surface of a connection portion 71. The protruding portion 97 is embedded into, for example, a first adhesive layer 51 from the outer peripheral surface of the connection portion 71. When the connection hole 91 is formed in the step in FIG. 7, a recessed portion (or a cavity) that communicates with the connection hole 91 is formed so as to be located in the first adhesive layer 51.

When conductive paste is supplied into the connection hole 91, the conductive paste also enters the recessed portions in the first adhesive layer 51. When the conductive paste is cured, the protruding portion 97 integrally formed with the connection portion 71 is formed in the first adhesive layer 51. With this protruding portion 97, the connection portion 71 is less likely to fall out from the connection hole 91. Note that the protruding portion 97 may be formed so as to be embedded into a layer or a member in the support member 50 other than the first adhesive layer 51.

Embodiments of the present invention have been described above with reference to specific examples. However, the present invention is not limited to these specific examples. All aspects that can be practiced by a person skilled in the art modifying the design as appropriate based on the above-described embodiments of the present invention are also included in the scope of the present invention, as long as they encompass the spirit of the present invention. In addition, in the spirit of the present invention, a person skilled in the art can conceive of various modified examples and alterations, and those modified examples and alterations will also fall within the scope of the present invention.

What is claimed is:

1. A planar light source comprising:
a light guide member having a first surface, a second surface opposite the first surface, and a first hole penetrating from the first surface to the second surface;
a light source that is disposed in the first hole of the light guide member and comprises:
a light-emitting element, and
a first light adjustment member disposed on an upper surface of the light-emitting element, wherein the first light adjustment member has light reflectivity and is light-transmissive to light emitted from the light-emitting element;
a first light-transmissive member disposed in the first hole between a lateral surface of the light source and the light guide member and disposed on the light source; and
a second light adjustment member disposed on the first light-transmissive member, and having light reflectivity and being light-transmissive to light emitted from the light source; wherein:
a transmittance of the first light-transmissive member is higher than a transmittance of the first light adjustment member and a transmittance of the second light adjustment member with respect to the light emitted from the light source;
the first light-transmissive member comprises a first light-transmissive portion located between the first light adjustment member and the second light adjustment member, and a second light-transmissive portion located between the lateral surface of the light source and the light guide member; and
the second light adjustment member has a portion having a maximum thickness, which is located on the second light-transmissive portion in a cross-sectional view.

2. The planar light source according to claim 1, wherein:
in the cross-sectional view, a thickness of the second light adjustment member increases from a portion located on a boundary between the lateral surface of the light source and the first light-transmissive member toward the portion having the maximum thickness, and decreases from the portion having the maximum thickness toward a portion located on a boundary between the first light-transmissive member and the light guide member.

3. The planar light source according to claim 1, wherein:
a thickness of a portion of the second light adjustment member located on an axis passing through a center of an upper surface of the light source is in a range from 30% to 95% of a thickness of the portion having the maximum thickness.

4. The planar light source according to claim 1, wherein:
the second light adjustment member covers an upper end of the boundary between the first light-transmissive member and the light guide member.

5. The planar light source according to claim 1, wherein:
an upper surface of the second light adjustment member is a convex surface.

6. The planar light source according to claim 1, wherein:
the transmittance of the second light adjustment member is higher than the transmittance of the first light adjustment member with respect to the light emitted from the light source.

7. The planar light source according to claim 1, wherein:
in a plan view, the second light adjustment member covers an entirety of the light source.

8. The planar light source according to claim 1, wherein:
an entirety of a lower surface of the second light adjustment member is located above the upper surface of the first light adjustment member.

9. The planar light source according to claim 1, wherein:
the second light-transmissive portion has a recessed portion at an upper surface thereof.

10. The planar light source according to claim 1, wherein:
a portion of the second light adjustment member having a thickness greater than a thickness of the portion located on an axis passing through a center of an upper surface of the light source surrounds the light source without a gap in the top view.

11. The planar light source according to claim 1, wherein:
in the cross-sectional view, the light source is sandwiched between regions of the second light-transmissive portion; and
a maximum thickness of a portion of the second light adjustment member located on a first of the regions of the second light-transmissive portion is in a range from 0.9 times to 1.1 times a maximum thickness of a portion of the second light adjustment member located on a second of the regions of the second light-transmissive portion.

\* \* \* \* \*